United States Patent
Lee et al.

(10) Patent No.: US 8,010,796 B2
(45) Date of Patent: Aug. 30, 2011

(54) SYSTEM AND METHOD FOR DIGITALLY SIGNING AN ELECTRONIC DOCUMENT

(75) Inventors: Chung-I Lee, Taipei Hsien (TW); Hai-Hong Lin, Shenzhen (CN); Guo-Ling Ou-Yang, Shenzhen (CN); Yao-Huei Sie, Taipei Hsien (TW); Gang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 469 days.

(21) Appl. No.: 12/195,430

(22) Filed: Aug. 21, 2008

(65) Prior Publication Data

US 2009/0164791 A1 Jun. 25, 2009

(30) Foreign Application Priority Data

Dec. 21, 2007 (CN) .......................... 2007 1 0203317

(51) Int. Cl.
*H04L 9/32* (2006.01)
*G06F 21/00* (2006.01)
*G06F 7/04* (2006.01)
*G06K 9/00* (2006.01)

(52) U.S. Cl. ........ 713/176; 713/165; 713/168; 713/180; 713/182; 726/5; 382/119; 382/140

(58) Field of Classification Search .................. 713/176, 713/165, 168, 180, 182; 726/5; 382/119, 382/140
See application file for complete search history.

(56) References Cited

U.S. PATENT DOCUMENTS

| | | | | |
|---|---|---|---|---|
| 5,857,029 A | * | 1/1999 | Patel | 382/119 |
| 6,415,042 B1 | * | 7/2002 | Shin | 382/100 |
| 7,894,832 B1 | * | 2/2011 | Fischer et al. | 455/466 |
| 2007/0094510 A1 | * | 4/2007 | Ross et al. | 713/178 |
| 2007/0205261 A1 | * | 9/2007 | Postnikov et al. | 235/379 |

FOREIGN PATENT DOCUMENTS

| | | |
|---|---|---|
| CN | 1397869 A | 2/2003 |
| CN | 1808490 A | 7/2006 |
| CN | 101017544 A | 8/2007 |

* cited by examiner

*Primary Examiner* — Aravind Moorthy
(74) *Attorney, Agent, or Firm* — Altis Law Group, Inc.

(57) ABSTRACT

A method for digitally signing an electronic document is disclosed. The method includes generating an electronic document to be signed and notifying an authorized signer to sign the electronic document. The method includes validating if the user is the authorized signer for the electronic document by comparing the received identification and the password with a digital certificate of the authorized signer stored in a database. Additionally, the method includes obtaining an image including a digital signature of the authorized signer from a database and resizing the image and inserting the resized image into the signature area of the electronic document if the user is the authorized signer.

6 Claims, 3 Drawing Sheets

SYSTEM AND METHOD FOR DIGITALLY SIGNING AN ELECTRONIC DOCUMENT

BACKGROUND

1. Field of the Invention

Embodiments of the present disclosure relate to systems and methods for digitally signing an electronic document, particularly to a system and method for inserting an image including a digital signature into electronic documents.

2. Description of Related Art

Generally, a public key cryptogram algorithm (such as RSA and elliptic curve cryptography (ECC)), also known as an asymmetry algorithm, is used for encrypting and decrypting electronic documents with different keys (a public key and a private key). The public key is used for verifying the identity of a signer when the signer receives a digital signature. The private key is kept hidden and used for completing the digital signature. A digital certificate includes the public key, the private key, signer information, etc., which are issued by an authoritative third-party organization.

Current digital signature signing technology commonly reads the signer information using a computer, and outputs the signer information to a signature area of an electronic document. However, such digital signatures are too simplistic and cannot meet requirements of individual signatures. Meanwhile, it is difficult to discern if the digital signature is effective.

What is needed, therefore, is a system and method for improved digitally signed electronic documents.

SUMMARY

A system for digitally signing an electronic document is provided. The system comprising: an electronic document generating unit configured for generating the electronic document to be signed, the electronic document defining at least one signature area for insertion of an authorized digital signature; a notifying unit configured for notifying an authorized signer to sign the electronic document; a singing unit configured for obtaining an image including a digital signature of the authorized signer from a database, resizing the image corresponding to a size of the signature area, and inserting the resized image into the signature area of the electronic document; and at least one processor executing the electronic document generating unit, the notifying unit and the signing unit to digitally sign the electronic document.

Other objects, advantages and novel features will become more apparent from the following detailed description of certain embodiments of the present disclosure when taken in conjunction with the accompanying drawings, in which:

DETAILED DESCRIPTION OF CERTAIN INVENTIVE EMBODIMENTS

Figure 1:
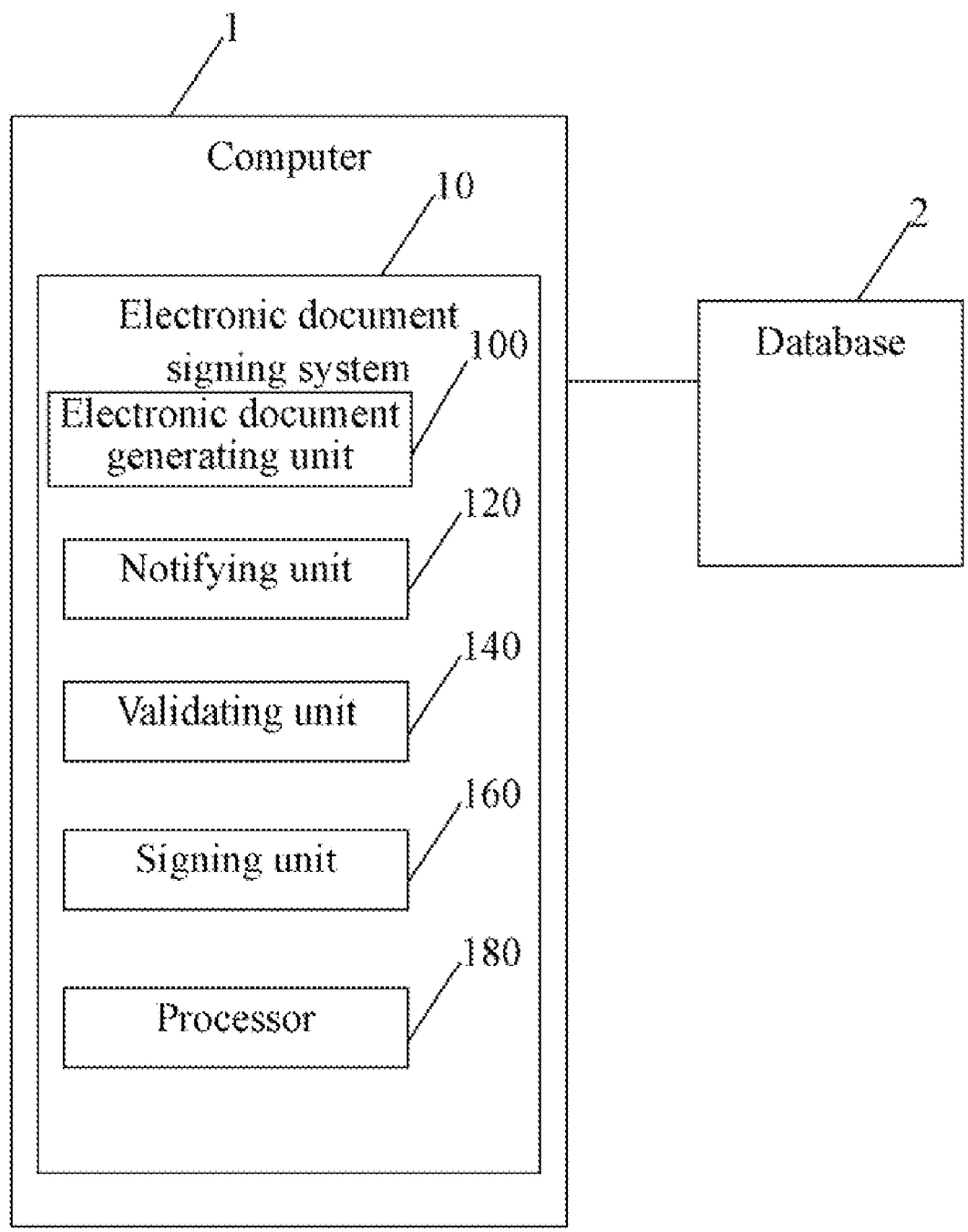
FIG. 1 is a block diagram of one embodiment of a system for digitally signing an electronic document.

FIG. 1 is a block diagram of one embodiment of a computer 1 comprising an electronic document signing system 10 for digitally signing an electronic document. A database 2 connects with the computer 1 via a database connection, such as an Open Database Connectivity (ODBC) or a Java Database Connectivity (JDBC). The database 2 stores at least one digital certificate of an authorized signer and one image including a digital signature of the authorized signer. The digital certificate includes a public key, a private key, signer information, for example, which are issued by an authorized third-party.

In one embodiment, the electronic document signing system 10 includes an electronic document generating unit 100, a notifying unit 120, a validating unit 140, a signing unit 160.

The electronic document generating unit 100 is configured for generating electronic documents to be digitally signed. Each electronic document defines at least one signature area to be inserted with an authorized digital signature. Depending on the embodiment, the electronic document may be a contract or other kinds of documents in the portable document format (PDF), the .doc format, or the .xls format, for example. For example, in FIG. 3, the electronic document may be a contract 60 defining two signature areas, such as a signature area 600 for the selling party and a signature area 601 for the buying party. The signature area 600 for the selling party and the signature area 601 for the buying party comprises a digital signature, such as a digital signature of a seller.

The notifying unit 120 is configured for notifying an authorized signer to sign the contact 60 after generating the contract. The notifying unit 120 may notify the authorized signer by sending a short message (e.g., a SMS), an email, or other means.

The validating unit 140 is configured for receiving an identification and a password input by a user (e.g., the selling party and/or the buyer party), and for validating if the identification and the password corresponds to a predetermined identification and a predetermined password of the authorized signer by comparing the identification and the password with the digital certificate of the authorized signer stored in the database 2.

The signing unit 160 is configured for reading an image of the authorized signature corresponding to the identification and resizing the image corresponding the signature area to form a resized image. The signing unit is further configured for inserting the resized image into the signature area if the user is the authorized signer. For example, in FIG. 3, the signing unit 160 obtains the image including the digital signature of the seller, and resizes the image corresponding to a size of the signature area for the selling party 600, and inserts the resized image of the seller into the signature area 600.

The electronic document signing system 10 further includes a processor 180 for executing the electronic document generating unit 100, the notifying unit 120, the validating unit 140, and the signing unit 160 to digitally sign the electronic document.

Figure 2:
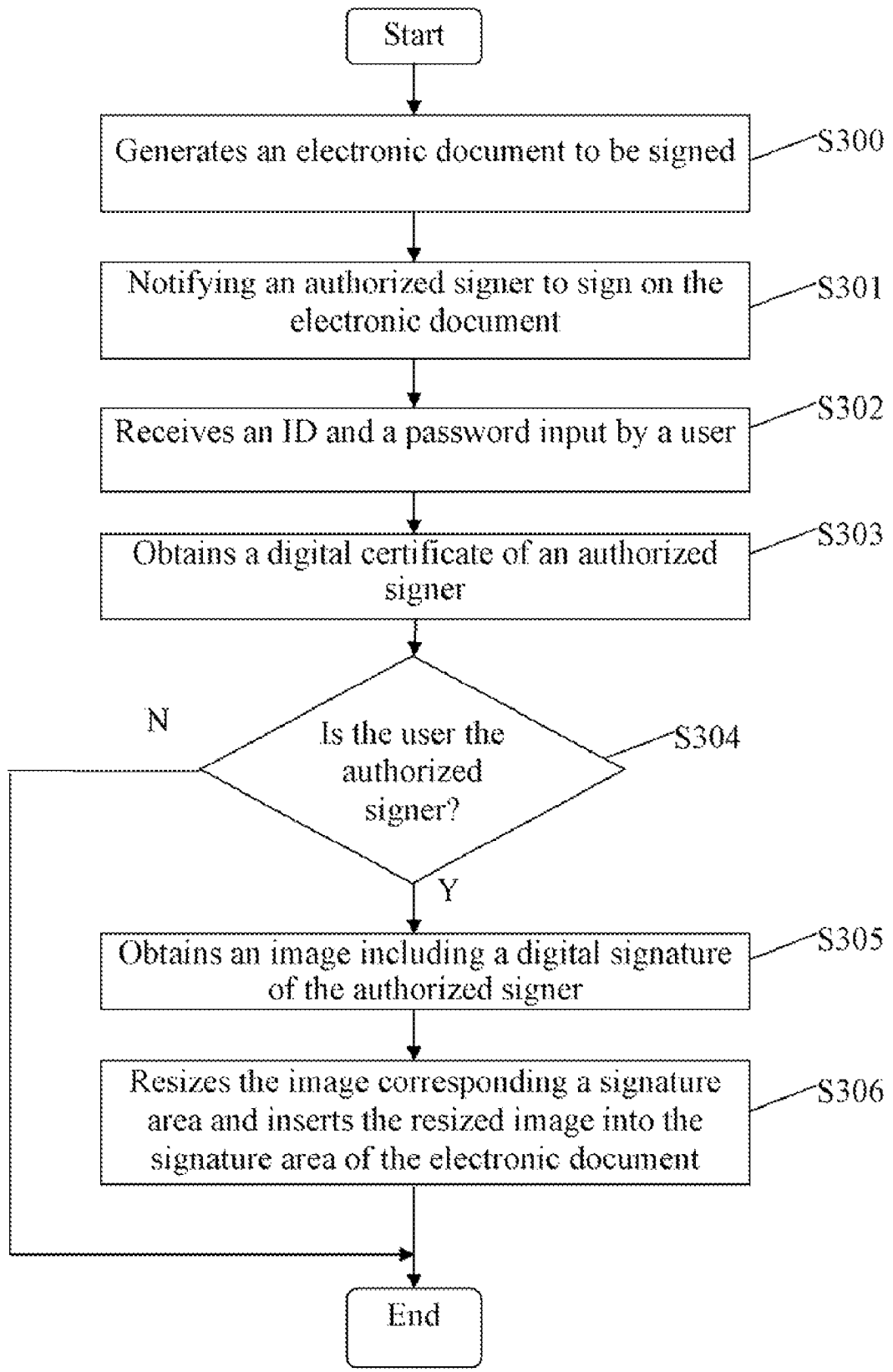
FIG. 2 is a flowchart of one embodiment of a method for digitally signing an electronic document.

FIG. 2 is a flowchart of one embodiment of a method for digitally signing an electronic document. The method as described in FIG. 2 may be used to digitally sign the contract 60 between a the selling party 600 and the buying party 601. Depending on the embodiment, additional blocks may be added, others deleted, and the ordering of the blocks may be changed. In block S300, the electronic document generating unit 100 generates the contract 60 to be signed comprising at least one signature area for an authorized digital signature.

In block S301, the notifying unit 120 notifies the authorized signer(s) to sign the contract 60 after generating the contract 60. The notifying unit 120 may notify the authorized signer by sending a short message, an email, or other means.

The authorized signer(s) may then input an identification and/or a password into the electronic document signing system 10.

In block S302, the validating unit 140 receives the identification and the password input by the authorized signer(s). In block S303, the validating unit 140 obtains the digital certificate of the authorized signer(s) from the database 2. In block S304, the validating unit 140 validates if the authorized signer (s) are the authorized signers for the contract 60 by comparing the received identification and the password with the digital certificate of the authorized signer(s).

In block S305, the signing unit 160 obtains an image including a digital signature of the authorized signer(s) from the database 2 if the authorized signer(s) are the authorized signers for the contract 60. In block S306, the signing unit 160 resizes the image corresponding to a size of the signature area and inserts the resized image into the signature area of the electronic document, and the procedure ends. For example, in FIG. 3, the signing unit 160 obtains the image including the digital signature of the seller, and resizes the image corresponding the signature area, and inserts the resized image of the seller into the signature area 600.

In block S304, the block ends if the user is not the authorized signer.

Figure 3:
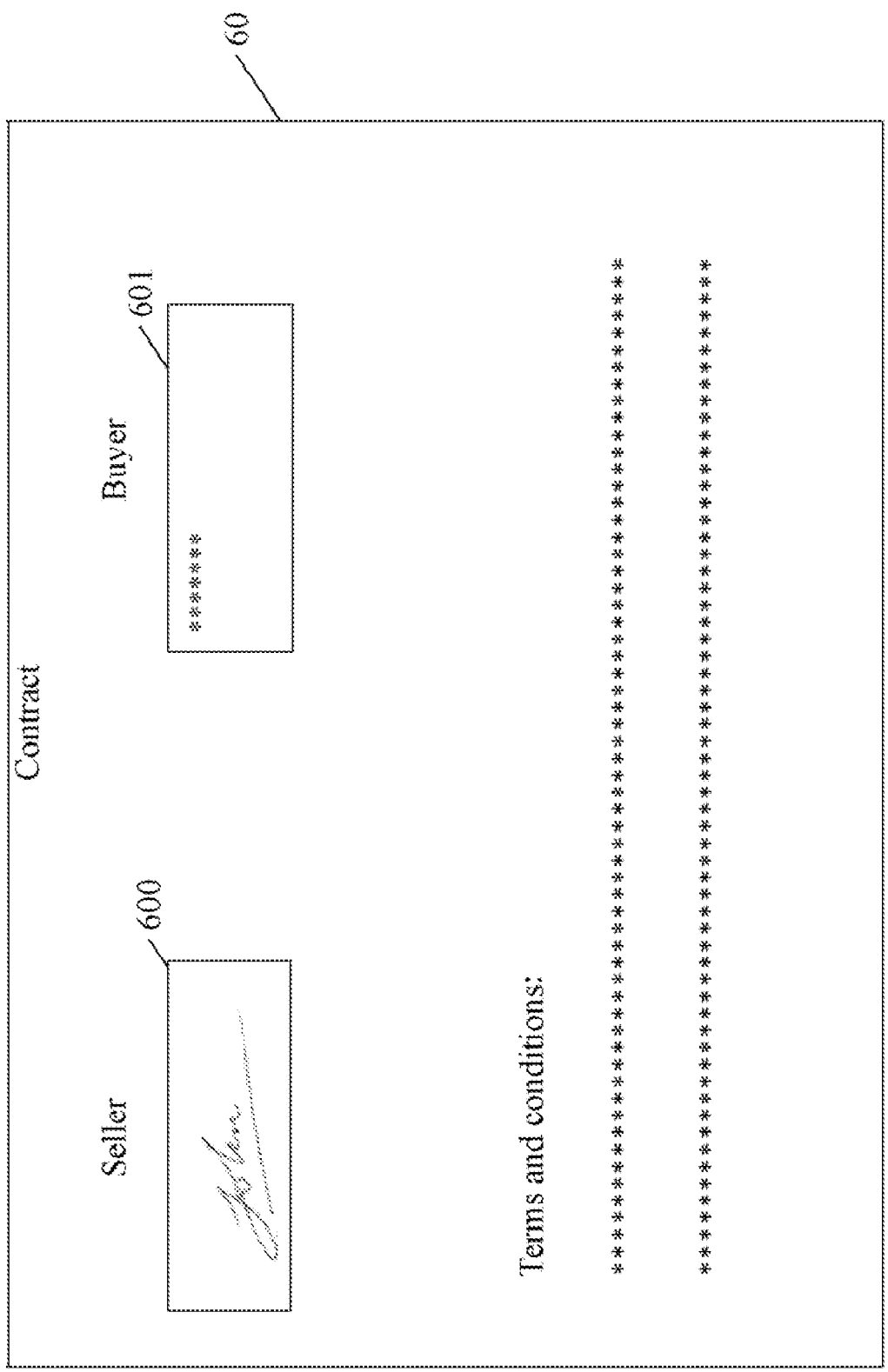
FIG. 3 is one embodiment of an electronic document to be signed by one or more authorized users of the electronic document signing system.

FIG. 3 is one embodiment of an electronic document to be signed by one or more authorized users of the electronic document signing system 10. As mentioned above, the electronic document, in one embodiment, may define two signature areas. The signature area 600 may be used by the selling party to sign and the signature are 601 may be used by the buying party to sign. The signature area 600 has been inserted the image as to indicate a digital signature of the selling party.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for digitally signing an electronic document, the system comprising:
    an electronic document generating unit configured for generating the electronic document to be signed, the electronic document defining at least one signature area for insertion of an authorized digital signature;
    a notifying unit configured for notifying an authorized signer to sign the electronic document by sending a short message or an email after generating the electronic document;
    a signing unit configured for obtaining an image including a digital signature of the authorized signer from a database, resizing the image corresponding to a size of the signature area, and inserting the resized image into the signature area of the electronic document; and
    at least one processor executing the electronic document generating unit, the notifying unit and the signing unit to digitally sign the electronic document.

2. The system as claimed in claim 1, further comprising a validating unit configured for receiving an identification and a password input by a user, and for validating if the user is the authorized signer for the electronic document by comparing the identification and the password with a digital certificate of the authorized signer stored in the database.

3. The system as claimed in claim 1, wherein the image is obtained by scanning a signature of the authorized signer.

4. A computer-based method for digitally signing an electronic document, comprising:
    generating the electronic document to be signed, the electronic document having a signature area for an authorized digital signature;
    notifying an authorized signer to sign the electronic document by sending a short message or an email after generating the electronic document;
    receiving an identification and a password input by a user, and validating if the user is the authorized signer for the electronic document according to a digital certificate of the authorized signer stored in a database;
    obtaining an image including a digital signature of the authorized signer from the database; and
    resizing the image corresponding to a size of the signature area and inserting the resized image into the signature area of the electronic document upon the condition that the user is the authorized signer.

5. The method as claimed in claim 4, wherein the image is obtained by scanning a signature of the authorized signer.

6. A non-transitory computer-readable medium having stored thereon instructions that, when executed by a computer, causing the computer to perform a method for digitally signing an electronic document comprising:
    generating the electronic document to be signed, the electronic document having a signature area for an authorized digital signature;
    notifying an authorized signer to sign the electronic document by sending a short message or an email after generating the electronic document;
    receiving an identification and a password input by a user, and validating if the user is the authorized signer for the electronic document according to a digital certificate of the authorized signer stored in a database;
    obtaining an image including a digital signature of the authorized signer from the database; and
    resizing the image corresponding to a size of the signature area and inserting the resized image into the signature area of the electronic document upon the condition that the user is the authorized signer.

* * * * *